Figure 1:
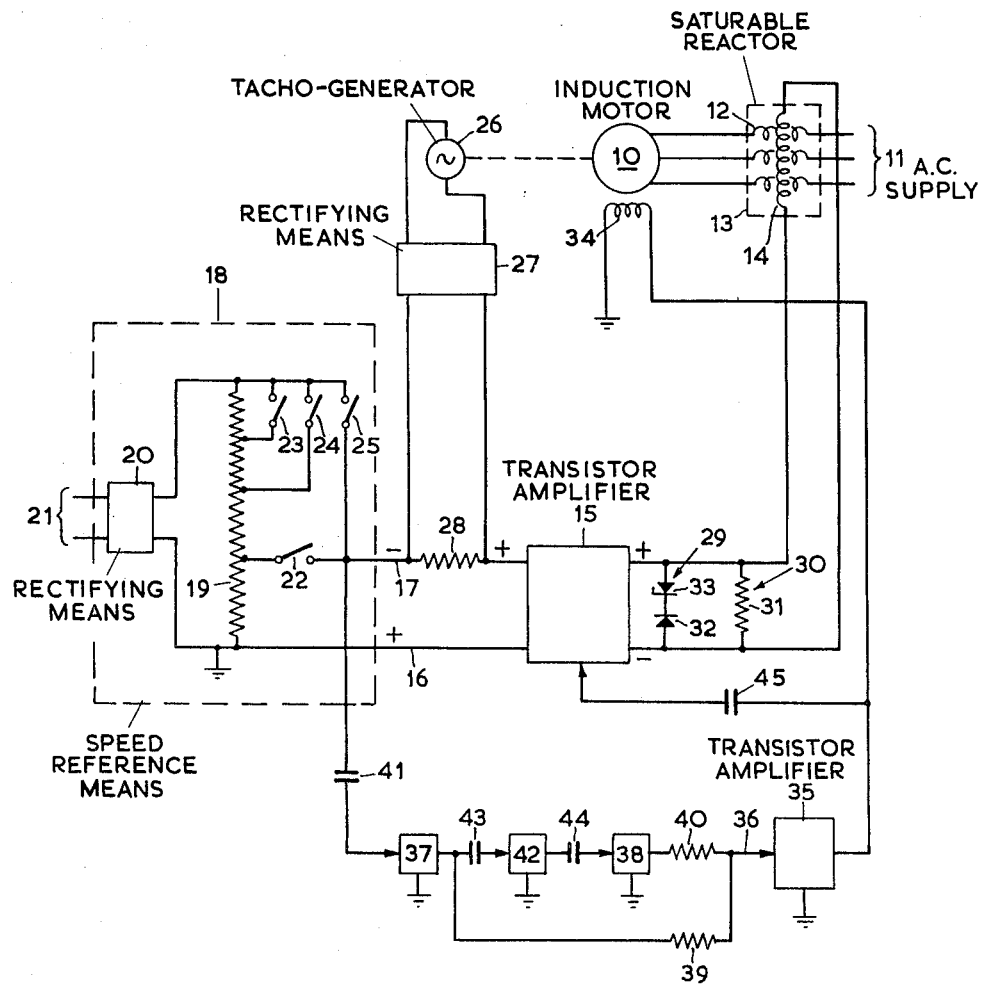

May 10, 1966     E. J. PEPPER     3,250,975
ELECTRIC MOTOR SPEED AND BRAKING CONTROL SYSTEMS
Filed Jan. 10, 1963     4 Sheets-Sheet 1

May 10, 1966    E. J. PEPPER    3,250,975
ELECTRIC MOTOR SPEED AND BRAKING CONTROL SYSTEMS
Filed Jan. 10, 1963    4 Sheets-Sheet 2

United States Patent Office 3,250,975
Patented May 10, 1966

3,250,975
ELECTRIC MOTOR SPEED AND BRAKING CONTROL SYSTEMS
Edward John Pepper, Kidsgrove, Stoke-on-Trent, England, assignor to The English Electric Company Limited, London, England, a British company
Filed Jan. 10, 1963, Ser. No. 250,557
Claims priority, application Great Britain, Jan. 11, 1962, 44,800/61; Mar. 30, 1962, 12,231/61
15 Claims. (Cl. 318—229)

This invention relates to electric motor speed control systems.

According to the present invention an electric speed control system for an electric motor includes means for producing a speed reference signal which is adjustable in steps whereby to change the reference speed of the motor in steps, means for producing a feedback signal dependent on the speed of the motor, means responsive differentially to the speed reference and feedback signals for energising the motor in dependence upon the excess of the reference speed over the motor speed in a manner tending to maintain the motor speed near the selected reference speed, electric braking means for exerting when energised a braking torque on the motor whereby to reduce its speed, and braking control means responsive to step reductions in the reference speed for energising the braking means temporarily on the occurrence of such a reduction of the reference speed whereby to cause the motor speed to fall to a predetermined value near that corresponding to the newly selected reference speed.

According to another feature of the present invention the means for energising the motor in dependence upon the excess of the reference speed over the motor speed includes an amplifying means for effecting control of the energisation of the motor in dependence upon the said excess, and gain controlling means responsive to step reductions in the reference speed for temporarily reducing the effective output/input gain of the amplifying means from a predetermined normal operating value on the occurrence of such a step reduction and for subsequently restoring the effective gain gradually to its normal operating value whilst the motor speed is below the newly selected reference speed.

According to another feature of the present invention the amplifying means includes a resistor of predetermined value, a controllable impedance device responsive to the said excess for controlling the flow of current from a D.C. supply source through the resistor in dependence upon the said excess, and an output terminal connected adjacent the said resistor and controllable impedance device for providing an output potential for controlling the motor energisation, and the gain controlling means comprises an auxiliary electric circuit for controlling the flow of current through the said resistor from an intermediate potential tapping of the D.C. supply source, which auxiliary circuit includes in series relationship a second controllable impedance device and a diode, and control means responsive to step reductions in the reference speed for temporarily changing the impedance of the second controllable impedance device from a predetermined normal operating value to another and substantially different value, and for subsequently restoring the impedance of this device gradually to its normal operating value.

The second controllable impedance device may comprise a temperature responsive resistance device, whilst the control means responsive to step reductions in the reference speed may comprise means for changing the temperature of the temperature responsive resistance device from a predetermined normal operating value and for enabling the temperature of this device to be restored gradually to its normal operating value.

Preferably the temperature responsive resistance device has a characteristic such that its resistance value decreases with increase in temperature, and the control means responsive to step reductions in the reference speed comprises means for temporarily heating up the resistance device whereby to reduce its resistance to a value substantially less than its normal operating value, the resistance of this resistance device being restored gradually to its normal operating value on subsequently cooling.

According to another feature of the present invention the braking control means includes a timing means for maintaining the braking means energised for a predetermined interval of time after the occurrence of such a step reduction in reference speed, such as to enable the motor speed to fall rapidly to the predetermined value.

Preferably the speed reference means is arranged to automatically vary the length of the braking time interval in dependence upon the magnitude of the step reduction in the speed reference signal which initiates the braking time interval.

Two electric speed control systems according to the present invention for controlling two squirrel cage induction motors arranged to drive knitting machines will now be described by way of example and with reference to FIG. 1 to 5 of the accompanying drawings.

Figure 2:
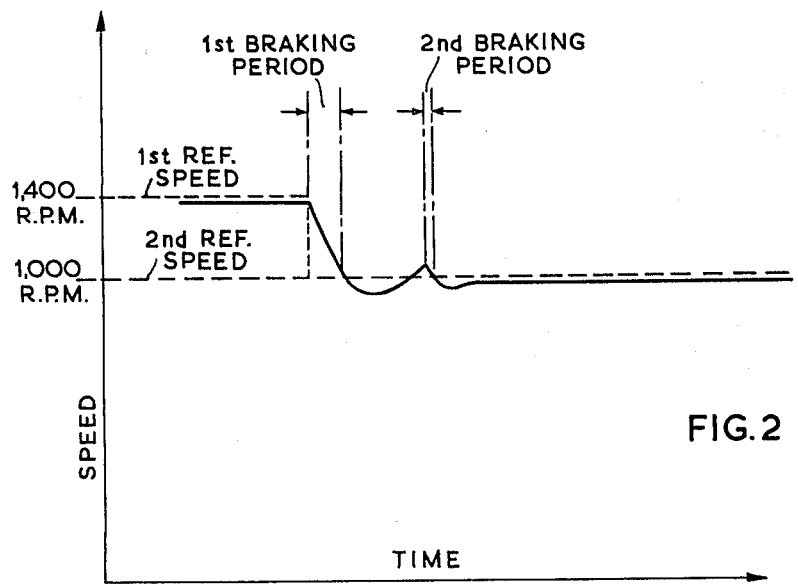
Figure 3:
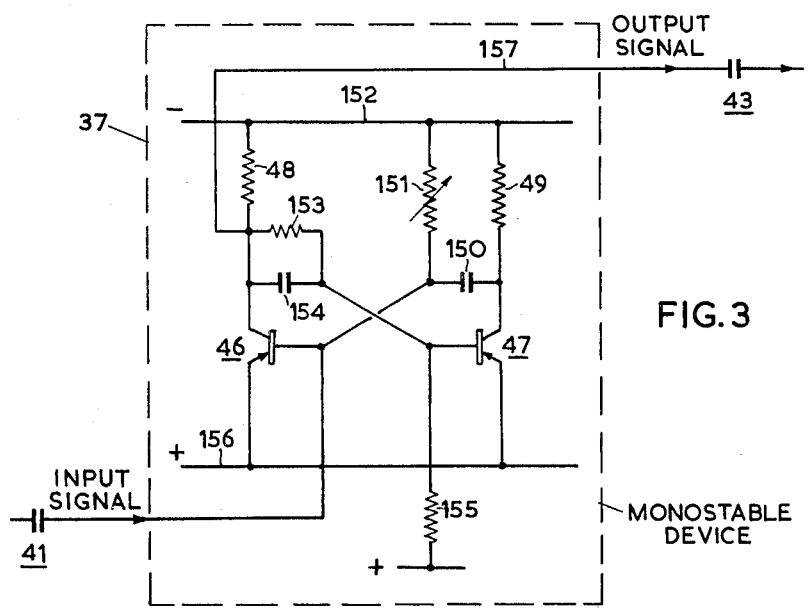
Figure 4:
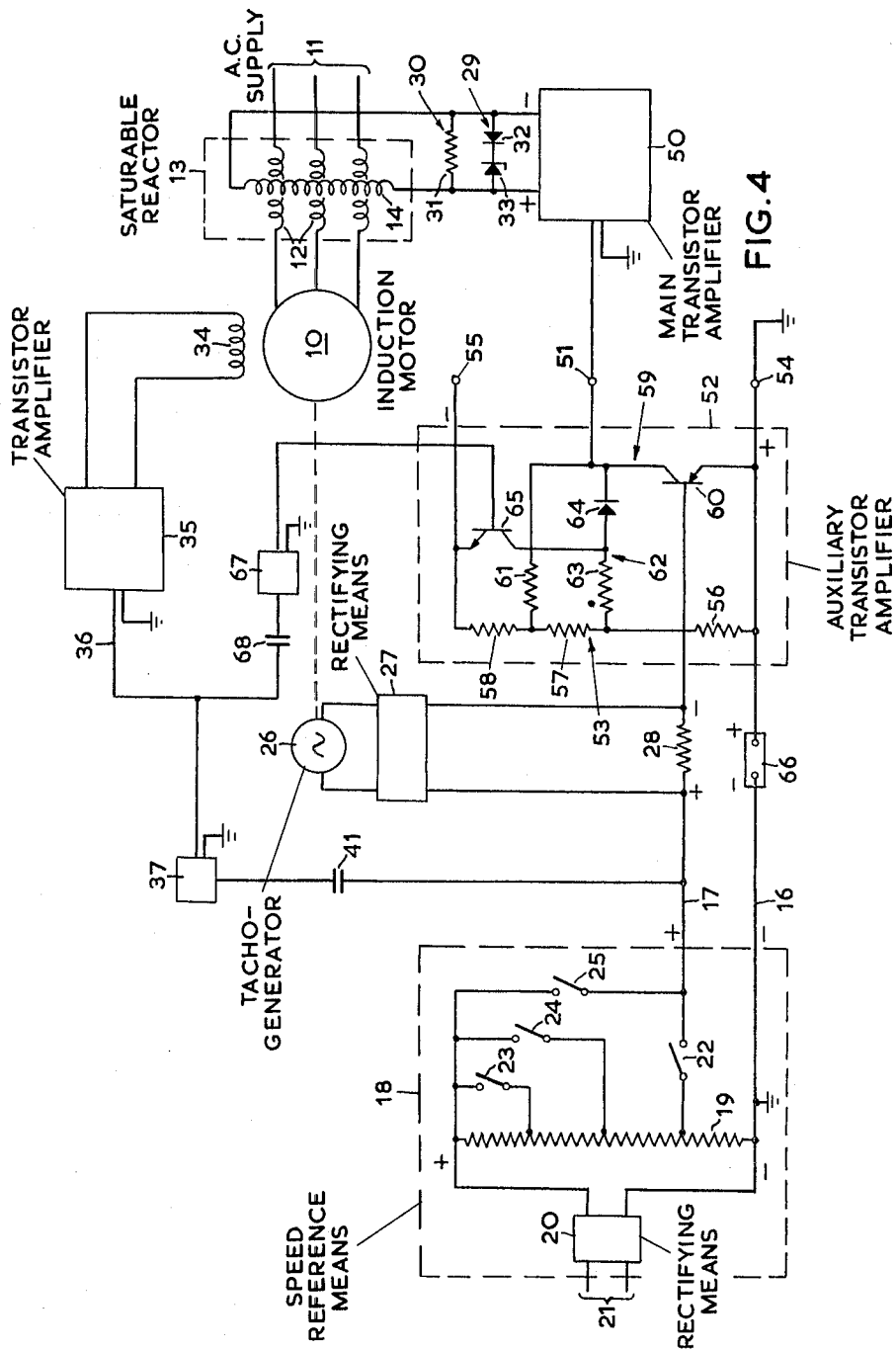
Figure 5:
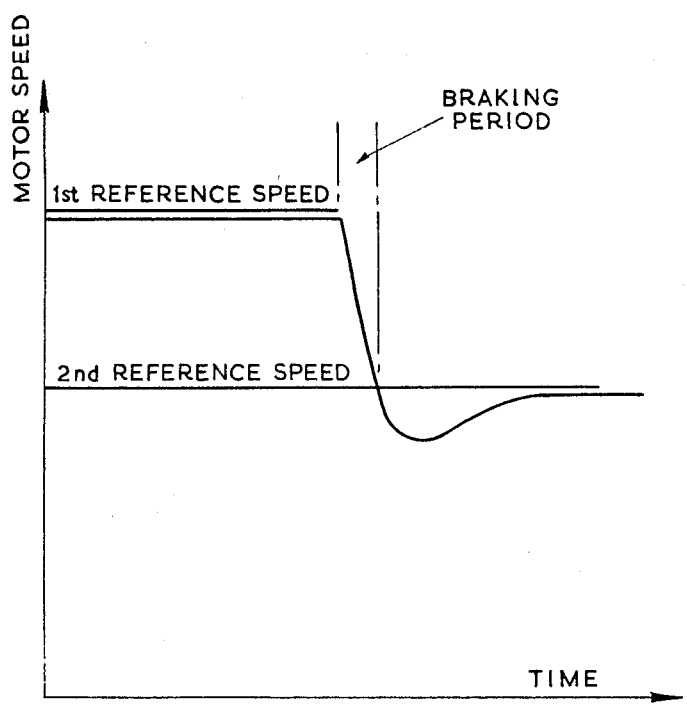

FIG. 1 shows diagrammatically the principal relevant circuit connections of the first control system; FIG. 2 shows the manner in which the speed of the motor controlled by the first control system changes in response to a step-like reduction in a speed reference signal; FIG. 3 shows diagrammatically the circuit connections of a monostable device which may be used in the circuit of FIG. 1; FIG. 4 shows diagrammatically the principal circuit connections of the second control system; and FIG. 5 shows the manner in which the speed of the motor controlled by the second control system changes in response to a step-like reduction in a speed reference signal.

Referring now to FIG. 1 of the drawings the squirrel cage induction motor 10 is supplied from an A.C. supply source 11 of constant frequency and voltage through the A.C. windings 12 of a saturable reactor 13. The latter has a D.C. control winding 14 which is energised by a transistor amplifier 15 in dependence upon the magnitude of a positive speed error signal supplied to its input circuit, that is in dependence upon the excess of a selected reference speed over the actual motor speed.

A speed reference voltage is developed between the output circuit connections 16, 17 of a speed reference means 18 which incorporates a tapped voltage dividing resistor 19, a rectifying means 20 for supplying the resistor 19 with direct current from a single phase A.C. supply source 21, and switches 22 to 25 for varying the speed reference voltage in steps. Switch 22 serves to complete the output circuit of the reference means, whilst the switches 23 to 25 are used to vary the voltage appearing at the output circuit by short-circuiting successive sections of the resistor 19.

A speed feedback voltage is generated by an A.C. tachogenerator 26 driven by the induction motor 10, is rectified by a rectifier 27, and is developed across a resistor 28. The latter is connected in series with the output circuit of the speed reference means 18 in a manner such that the speed reference and feedback voltages oppose one another when the motor is running in the sense represented by the polarity of the reference voltage. This speed error detecting circuit is connected with the input circuit of the amplifier 15 as shown in a manner such that the output voltage of the amplifier 15 increases with increases in the positive speed error.

Two energy dissipating circuits 29, 30 are connected in parallel with the D.C. control winding 14 of the saturable reactor, one of these circuits including a resistor 31, and the other including two opposed diodes 32, 33. The diod 32 opposes the flow of current through this dissipation circuit from the amplifier 15, whilst the other diode opposes the circulation of current by the control winding 14 when the output of the amplifier 15 is suddently reduced, and has a zener voltage such as a limit to a safe value the magnitude of any reverse voltage that may be developed across the transistor amplifier when the output voltage of the latter is abruptly reduced to a low value.

The induction motor 10 is provided with an additional stator winding 34 for effecting, when energised with direct current, electric braking of the motor. This winding is supplied with direct current of constant magnitude by a transistor amplifier 35 in response to control signals applied to an input circuit 36.

Such control signals are derived from the output circuits of two monostable transistor devices 37 and 38, the input circuit 36 of the braking amplifier 35 being connected to the output circuits of the devices 37 and 38 through current-limiting resistors 39 and 40 respectively of high resistance value.

The first monostable device 37 is responsibe to step changes in the magnitude of the speed reference voltage, an input circuit of the device 37 being connected through a capacitor 41 to the negative output connection 17 of the reference means 18. In operation this device 37 produces an output voltage which renders the braking amplifier 35 cut off, and the braking winding 34 unenergised, except on the occurrence of a sudden and substantial reduction in the reference voltage such as is produced by the opening of one of the switches 22 to 25, the output voltage of the device 37 then changing to a second value sufficient to cause the breaking amplifier 35 to conduct and so energise the braking winding 34. Once triggered by such a reduction in reference voltage the device 37 maintains its output voltage at this second value for a predetermined time interval dependent on the parameters of the device 37, after which the output voltage reverts to its former value and electrical braking ceases.

A third monostable transistor device 42 is responsive to changes in the output voltage of the first monostable device 37, an input circuit of the device 42 being connected to the output circuit of the device 37 through a capacitor 43; and this device 42 produces control signals for triggering the second-mentioned monostable device 38, a capacitor 44 connecting an output circuit of the device 42 with an input circuit of the device 38.

The second-mentioned monostable device 38 behaves, in response to variations in the output voltage of the device 42, in the same manner as the device 37 to cause the braking amplifier 35 to energise the braking winding 34. The amplifier 35 is maintained in a conducting state by the device 38, after this device has been triggered, for a predetermined period of time dependent on the values of the parameters of the device 38.

The third monostable device 42 on being triggered by the return of the output voltage of the first monostable device 37 to its first value changes its output signal from a first value to a second value, and maintains it at the second value for a predetermined time interval dependent on the values of the parameters of this device 42. The first and second values of this output signal are such that as this output voltage reverts to its first value the second monostable device 38 is triggered whereby to cause its output voltage to change to its second value and thereby cause the amplifier 35 to energise the braking winding 34. The output circuit of the braking amplifier 35 is also connected with the input circuit of the amplifier 15 through a capacitor 45 so as to provide a transient feedback signal for cutting off the amplifier 15 on energising the braking winding regardless of the magnitude of any speed error voltage still present to the input circuit of the amplifier 15.

In operation the speed of the motor 10 is controlled by varying the voltage applied to its stator windings, this voltage being varied by variation of the current supplied to the control winding 14 of the saturable reactor whereby to vary the voltage drop developed across the A.C. windings 12 of the reactor.

Under normal operating conditions the speed of the motor is slightly less than a value determined by the reference speed voltage so that the current flowing in the control winding 14 is varied automatically by the amplifier 15 in dependence on the magnitude of the speed error voltage, and in a sense tending to reduce a positive speed error.

The closure of any of the switches 23 and 25 to increase the speed reference voltage merely increases temporarliy the positive speed error, and as a result the A.C. voltage applied to the motor is increased until the speed error is again just sufficient to maintain the motor operating at a speed in close agreement with the speed reference value. The abrupt increase in reference voltage on closing any of these three switches has no effect on the monostable device 37 so that the braking amplifier 35 remains in a cut-off condition and the braking winding 34 unenergised.

On the other hand, the opening of any of the switches 23 to 25 to decrease the speed reference voltage results not only in a reversal of the sense of the speed error and a consequent cutting off of the amplifier 15, but also in the simultaneous production of a trigger or transient voltage pulse at the input circuit of the monstable device 37 to initiate a braking cycle. The device 37 thereupon causes the braking amplifier 35 to energise the braking winding 34, and a voltage pulse is simultaneously fed back through the capacitor 45 to the amplifier 15 to suppress any positive speed error signal that still persists. At the end of a predetermined time interval the output voltage of the monostable device 37 returns to its first value, the braking amplifier 35 reverts to its former cut-off state, and electrical braking of the motor ceases. This first predetermined period of braking is adjusted, by adjustment of the values of one or more of the parameters of the monostable device 37, so that electrical braking continues until the motor speed has fallen to a value just exceeding the new reference speed voltage as determined by the new condition of the switches 23 to 25.

The fall in the output voltage of the device 37 at the end of this predetermined period of braking results in the application of a trigger pulse to the monostable device 42 which thereupon raises its output voltage to the second value, at which it persists for a predetermined period of time, as previously mentioned.

During this second period of time the motor speed falls under the influence of the motor load to a value below the reference speed so that an increasing positive speed error voltage is again applied to the amplifier 15 whereby to increase the A.C. voltage applied to the induction motor stator windings and thereby increase the motor speed towards the reference value. As a result of the reintroduction of the power mode of motor operation the speed of the motor tends to rise again above the speed reference value, and in order to counter this speed rise a further period of electrical braking is initiated as follows.

The fall in the output voltage of the device 42 at the end of the second predetermined period results in the application of a trigger pulse to the monostable device 38 which thereupon raises its output voltage to the said second value whereby to cause the braking amplifier 35 to re-energise the braking winding 34 and re-introduce electric braking.

This further period of electric braking continues until the output voltage of the device 38 falls to its first value, at which time the motor speed has again fallen to a value just exceeding the reference value. In the absence of a positive speed error, and hence of any appreciable A.C. voltage at the motor stator windings, the motor decelerates to a speed below the reference value, whereupon the amplifier 15 in response to a new and increasing positive speed error increases the A.C. voltage applied to the stator windings whereby to arrest the fall in motor speed and once more control it in accordance with the speed reference value.

It has been found in practice that this control system enables very rapid transitions to lower speeds to be made with very little overshoot and with very little oscillation about the desired lower speed value.

FIG. 2 shows to a base of time the manner in which a typical speed reduction occurs with the present system. The dotted line represents the speed reference value, whereas the full line represents the actual speed of the motor.

The dissipation circuit 29 which includes the zener diode 33 enables energy stored in the magnetic field associated with the reactor control winding 14 to be dissipated at the highest possible rate consistent with the safety of the transistor amplifier 15. This rapid dissipation of energy enables a rapid reduction of the A.C. voltage applied to the motor stator windings at the beginning of a braking period so that the braking effort becomes fully effective to decelerate the motor without any appreciable time delay.

The opening of the switch 22 to reduce the speed reference voltage to zero value is effective in the same way as already described above to substitute the braking mode of operation for the power mode of operation of the motor whereby to decelerate the motor to rest. Other control or adjustment means (not shown in FIG. 1 but referred to later in connection with FIG. 3) associated with the switch 22 operate simultaneously to adjust the values of the parameters of the monostable device 37 whereby to increase the length of the first period of electrical braking so as to ensure deceleration down to zero speed.

Similarly on operation of the switches 23 to 25 other control or adjustment means associated with these switches operate simultaneously therewith to adjust the parameters of the monostable devices 37, 38 and 42 whereby to adjust the timing of the braking cycle so as to suit the magnitude of each particular selected reduction in speed reference value.

In systems where a greater settling time of the motor on reducing the speed reference value is tolerable, the second braking period may be omitted altogether, the braking amplifier 35 in such a case being controlled solely by the output voltage of the monostable device 37.

FIG. 3 shows a circuit diagram of a typical monostable transistor device which is suitable for use in the control system of FIG. 1. In this device two transistors 46, 47 have collector load resistors 48, 49. The input signal to the device is applied to the base of the transistor 46. The base of this transistor is also connected through a capacitor 150 to the collector of the transistor 47 and through an adjustable resistor 151 to the negative supply line 152.

The output signal is taken from the collector of the transistor 46, and this collector is connected through a parallel R-C combination 153, 154 to the base of the transistor 47. The base of this latter transistor is also connected through a resistor 155 of high resistance value to a source of positive potential greater than that applied to the positive line 156 of the device so as to provide a standing bias potential for the transistor 47.

In the absence of a positive-going trigger input pulse the transistor 46 conducts and transistor 47 is cut off, the output circuit 157 being consequently maintained at a potential close to that of the positive line 156.

On applying an input trigger pulse to the base of the transistor 46 the latter cuts off and causes the potential of its collector and the output circuit 157 to fall to the potential of the negative line 152. This action renders the transistor 47 conducting thus raising its collector potential close to that of the positive line 156. The consequent flow of current through the adjustable resistor 151 and the associated capacitor 150 thereupon maintains the base of the transistor 46 sufficiently positive to retain this transistor cut off even after the input pulse has passed. As this charging current in the circuit 150, 151 decreases, the potential of the base of transistor 46 falls towards that of the negative line 152, so that after a predetermined time interval dependent on the time constant of this circuit 150, 151 the transistor 46 is once more rendered conducting. The potential of the output circuit 157 thus rises to its steady state value close to that of the positive line 156 and the transistor 47 becomes cut off once more.

The aforesaid control or adjustment means associated with the switches 22 to 25 for varying the values of the parameters of the monostable devices may be arranged to vary the time constant of the R-C circuit 150, 151 whereby to vary the durations of the respective periods of the braking cycle.

Referring now to the second control system shown diagrammatically in FIG. 4 it will be observed that this control system is generally similar to the first control system shown in FIG. 1, and that parts which are common to both systems bear the same respective references in both of the FIGS. 1 and 4.

In this second control system the control winding 14 of the saturable reactor 13 derives its direct current energisation from a main transistor amplifier 50 which has as its input signal a control potential developed at an output terminal 51 of an auxiliary transistor amplifier 52. The main amplifier 50 is arranged to increase the energisation of the saturable reactor control winding 14 as the said control potential falls, and vice versa.

The auxiliary amplifier 52 includes a potential-dividing resistor chain 53 connected between positive and negative terminals 54, 55 of a D.C. supply source, and including in series relationship three resistors 56 to 58; a speed error signal amplifying circuit 59 connected between the positive supply terminal 54 and the junction of the two resistors 57, 58 and including in series relationship the emitter-collector path of an amplifying transistor 60 and a collector circuit resistor 61; a gain-controlling auxiliary circuit 62 connected between the junction of the two resistors 56, 57 and the collector of the transistor 60 and including in series relationship a thermistor 63 (that is, a resistor having a negative temperature co-efficient of resistance) and a diode 64; and the emitter-collector path of a switching transistor 65 of the n-p-n connected between the negative supply terminal 65 and the junction of the thermistor 63 and diode 64.

The speed error voltage derived from the series-connected resistors 19 and 28 is applied, as the input signal for the auxiliary amplifier 52, between the emitter and base of the amplifying transistor 60, a negative bias potential source 66 being connected in the circuit so as to maintain the base of transistor operating in a negative potential range when the motor is running stably in accordance with a selected speed reference voltage.

A control voltage for the base-emitter path of the switching transistor 65 is derived from an output circuit of an electric monostable timing device 67, which in turn derives its input signal through a capacitor 68 from an output circuit of the electric monostable timing device 37.

The braking amplifier 35 for supplying direct current to the braking winding 34 of the motor 10 is controlled by the output potential of the timing device 37, and is arranged to supply current to the braking winding 34 only when the output potential of the device 37 changes from a first or quiescent state to a second or active state.

In operation, with the motor running stably at a speed lower than the selected reference speed, the speed error voltage applied to the base-emitter path of the amplifying transistor 60 is just sufficiently negative to maintain the requisite output potential at the terminal 51 of the auxiliary amplifier 52 and hence the requisite energisation of the saturable reactor control winding 14 necessary for maintaining the motor running at that speed.

An increase in motor speed resulting from a change in motor load results in a reduction of the speed error voltage applied to the amplifying transistor 60 so that the potential of the output terminal 51 rises and the energisation of the control winding 14 is consequently reduced. Similarly a fall in motor speed due to a load change results in a fall in the potential of the output terminal 51 and a consequent rise in the energisation of the control winding 14.

Under the condition of constant speed reference voltage the monostable timing device 37 is in its quiescent state, and the braking amplifier 35 is thus maintained cut-off and the braking winding 34 unenergised. In the absence of any change in the output voltage of the timing device 37, the monostable timing device 67 also remains in its quiescent state and consequently applies a positive potential to the base of the switching transistor 65 whereby to maintain this transistor non-conductive. No "self-heating" current therefore flows in the thermistor 63 through transistor 65.

The thermistor 63 is arranged to have a resistance value when cold which is high compared with that of the collector circuit resistor 61, so that any flow of current through the thermistor 63 to the collector load resistor 61 has little influence on the potential appearing at the output terminal 51, and hence on the output-input gain of the amplifying circuit 59. Thus when operating under constant speed reference voltage the output potential of the terminal 51 is determined almost solely by the magnitude of the speed error voltage applied to the amplifying transistor 60.

On opening any of the switches 23 to 25 whereby to reduce the speed reference voltage in a step-like manner, the speed error voltage becomes reversed in sense and thus assists the negative bias potential of the source 66, so that the amplifying transistor 60 is rendered fully conductive and the potential of the output terminal 51 increased to its maximum value. The main amplifier 50 is thus caused to cut off and thereby de-energise the saturable reactor control winding 14.

The abrupt change in speed reference voltage results in the application of a trigger pulse to the monostable timing device 37, and thereupon the output voltage of this device changes to its second state and thereby causes the braking amplifier 35 to energise the motor braking winding 34. The timing device 37 is arranged to maintain its output voltage at its second state for a predetermined period of time (referred to hereinafter as the braking period) sufficient to enable the speed of the motor to be reduced to a value just slightly greater than the newly selected reference speed, and then to revert to its quiescent state. Due to the retarding effects of the motor load, the motor speed continues to fall after completion of the aforesaid braking period.

When the motor speed falls below the newly selected reference speed the sense of the speed error voltage again becomes positive, and as a result the current conduction of the amplifying transistor 60 gradually falls with increase in the now positive speed error. However, at this time as will be explained later the collector circuit resistor 61 also carries an appreciable auxiliary current which flows from the junction of the resistors 56 and 57, and as a result the potential of the output terminal 51 falls only relatively slowly.

It will be recalled that the braking period was initiated by the change in output voltage of the timing device 37 consequent upon a reduction in the speed reference voltage. This change in output voltage also resulted simultaneously in the triggering of the timing device 67 which thereupon changed its output voltage to the said second state whereby to cause the switching transistor 65 to become temporarily conductive. The consequent flow of a large "self-heating" current in the thermistor 63 rapidly raised the temperature of the thermistor, thus reducing its resistance value to a value which is small compared with that of the collector circuit resistor 61. At the end of a predetermined period (referred to hereinafter as the heating period) the output voltage of the timing device 67 reverted to its quiescent state thus terminating the flow of the self-heating current in the thermistor.

Thus since the thermistor has now a relatively low resistance value an appreciable current flows from the junction of the resistors 56, 57 through the thermistor 63, the diode 64 and the collector resistor 61. Furthermore, since the resistance of the thermistor is now small compared with that of the resistor 61, the potential of the output terminal 51 is held at a value near that of the junction of the resistors 56 and 57 despite the decrease in the current supplied by the amplifying transistor 60. Hence the effective output/input gain of the auxiliary amplifier 52 is lower than normal and the return to normal power operation of the motor is consequently delayed.

With the termination of the flow of self-heating current in the thermistor the latter under the influence of its surroundings cools, with a consequent gradual increase in its resistance value and gradual reduction in the current flowing into the resistor 61. As a result of the increase in resistance of the thermistor relative to that of the resistor 61 the potential of the output terminal 51 falls gradually relative to the potential of the junction of the resistors 56 and 57, and eventually becomes dependent solely on the magnitude of the current flowing in the resistor 61 from the amplifying transistor 60.

It will therefore be appreciated that with the decrease in the current flowing in the thermistor the effective gain of the auxiliary amplifier 52 is gradually restored to its normal operating value. As a consequence the supply of current to the saturable reactor control winding 14 after the motor speed has fallen below the reference speed is increased smoothly. It has been found that by suitable adjustment of the parameters of the circuit arrangement, the speed of the motor may be caused to vary in the manner shown in FIG. 5, with no overshoot on approaching the newly selected reference speed, though with a slightly increased undershoot on falling initially from the original speed.

It has also been found that by adjustment of the parameters of this control system the timing device 67 and capacitor 68 may be omitted. In such a modified second control system, the timing device 37 controls both the braking period and the heating period, these two periods thus being of equal duration.

Though the second control system utilises only a single braking period, the system may be modified, if an overshoot in motor speed is experienced, by providing as in the first control system further timing means for controlling a second braking period.

What I claim as my invention and desire to secure by Letters Patent is:

1. An electric speed control system for an electric motor including means for producing a speed reference signal which is adjustable in steps whereby to change the reference speed of the motor in steps, means for producing a feedback signal dependent on the speed of the motor, energising means responsive differentially to the speed reference and feedback signals for energising the motor in dependence upon the excess only of the reference speed over the motor speed in a manner tending to maintain the motor speed near the selected reference speed, said energising means including an amplifying means for effecting control of the energisation of the motor in dependence upon the said excess, electric braking means for exerting when energised a braking torque on the motor whereby to reduce its speed, and braking control means responsive to the speed reference signal only and effective only on the occurrence of a step reduction in the speed reference signal to energise the braking means for a predetermined time interval whereby to cause the motor speed to fall to a predetermined value close to that corresponding to the newly selected reference speed, said braking control means including timing means for determining the said time interval, and gain controlling means responsive to the speed reference signal only and effective on the occurrence of a step reduction in speed reference signal to temporarily reduce the effective output/input gain of the amplifying means from a predetermined normal operating value and to subsequently restore the effective gain gradually to its normal operating value whilst the motor speed is below the newly selected reference speed.

2. An electric speed control system according to claim 1, wherein the braking control means includes a second timing means for re-energising temporarily the braking means after a predetermined time delay and for maintaining the braking means so energised for a second predetermined interval of time so as to enable the motor speed to fall a second time to the predetermined value.

3. An electric speed control system according to claim 1, wherein the speed reference means is arranged to automatically vary the length of the braking time interval in dependence upon the magnitude of the step reduction in the reference speed which initiates the braking time interval.

4. An electric speed control system according to claim 1, wherein the braking means comprises a braking winding on the motor.

5. An electric speed control system according to claim 1, wherein the amplifying means includes a resistor of predetermined value, a controllable impedance device to responsive to the said excess for controlling the flow of current from a D.C. supply source through the resistor in dependence upon the said excess, and an output terminal connected adjacent the said resistor and controllable impedance device for providing an output potential for controlling the motor energisation, and wherein the gain controlling means comprises an auxiliary electric circuit for controlling the flow of current through the said resistor from an intermediate potential tapping of the D.C. supply source, which auxiliary circuit includes in series relationship a second controllable impedance device and a diode, and control means responsive to step reductions in the speed reference signal for temporarily changing the impedance of the second controllable impedance device from a predetermined normal operating value to another and substantially different value, and for subsequently restoring the impedance of this device gradually to its normal operating value.

6. An electric speed control system according to claim 5, wherein the second controllable impedance device comprises a temperature responsive resistance device, and the control means responsive to step reductions in the speed reference signal comprises means for temporarily changing the temperature of the temperature responsive resistance device from a predetermined normal operating value and for enabling the temperature of this device to be restored gradually to it normal operating value.

7. An electric speed control system according to claim 6, wherein the temperature responsive resistance device has a characteristic such that its resistance value decreases with increase in temperature, and the control means responsive to step reductions in the speed reference signal comprises means for temporarily heating up the resistance device whereby to reduce its resistance to a value substantially less than its normal operating value, the resistance of this resistance device being restored gradually to its normal operating value on subsequent cooling.

8. An electric speed control system according to claim 7, wherein the control means responsive to step changes in the speed reference signal includes a switching means for enabling a heating current to flow in the temperature responsive resistance device whereby to effect heating of the resistance device, and auxiliary control means responsive to step reductions in the speed reference signal for causing the said switching means to become conductive for a predetermined time and thereby allow the flow of heating current in the temperature responsive resistance device.

9. An electric speed control system according to claim 8, wherein the speed reference signal producing means comprises means for producing at an output circuit thereof a speed reference voltage, and wherein the auxiliary control means includes an electric monostable device for controlling the said switching means and having an input circuit which is capacity-coupled to the output circuit of the speed reference voltage producing means, the monostable device being normally in a first state in which the switching means is maintained non-conducting and being transferred temporarily to a second state by a step reduction in the speed reference voltage whereby to render the switching means conductive for a predetermined interval of time.

10. An electric speed control system according to claim 9, wherein the speed reference means is arranged to automatically vary the length of the braking time interval in dependence upon the magnitude of the step reduction in the reference speed which initiates the braking time interval.

11. An electric speed control system according to claim 9, wherein the braking means comprises a braking winding on the motor.

12. An electric speed control system according to claim 9, wherein the speed reference signal producing means comprises means for producing at an output circuit thereof a speed reference voltage, and wherein the braking control means includes an electric amplifying means for supplying the braking means, and the timing means includes a monostable device (referred to hereafter as the first monostable device) for controlling the amplifying means and having an input circuit which is capacity-coupled with the output circuit of the speed reference voltage producing means, the monostable device being normally in a first state such as to maintain the amplifying means inoperative to energise the braking means, and being temporarily transferred to a second state by a step reduction in reference voltage whereby to cause the amplifying means to energise the braking means.

13. An electric speed control system according to claim 12, wherein the braking control means includes a second timing means for re-energising temporarily the braking means after a predetermined time delay and for maintaining the braking means so energised for a second predetermined interval of time so as to enable the motor speed to fall a second time to the predetermined value.

14. An electric speed control system according to claim 13, wherein the second timing means includes two further electric monostable devices, referred to hereinafter as the second and third monostable devices respectively, the second monostable device being controlled by the first monostable device and being operative to transfer temporarily from a first to a second state on the return of of the first monostable device from the second to the first state, and the third monostable device being controlled by the second monostable device and being operative to transfer temporarily from a first to a second state on the return of the second monostable device to the first state, the amplyifying means being rendered effective to energise the braking means a second time whereby to apply a braking effort to the motor by the third monostable device when in the said second state.

15. An electric speed control system for an electric motor including means for producing a speed reference signal which is adjustable in steps whereby to change the reference speed of the motor in steps, means for producing a feedback signal dependent on the speed of the motor, means responsive differentially to the speed reference and feedback signals for energising the motor in dependence upon the excess only of the reference speed over the motor speed in a manner tending to maintain the motor speed near the selected reference speed, electric braking means for exerting when energised a braking torque on the motor whereby to reduce its speed, and braking control means responsive to the speed reference signal only and effective only on the occurrence of a step reduction in the speed reference signal to energise the braking means for a predetermined time interval whereby to cause the motor speed to fall to a predetermined value close to that corresponding to the newly selected reference speed, the braking control means including timing means for determining the said time interval and a second timing means for re-energising temporarily the braking means after a predetermined time delay and for maintaining the braking means so energised for a second predetermined interval of time so as to enable the motor speed to fall a second time to the predetermined value.

References Cited by the Examiner

UNITED STATES PATENTS 3,090,901  5/1963  Shaw _____ 318—209

ORIS L. RADER, *Primary Examiner.*

D. F. DUGGAN, S. GORDON, *Assistant Examiners.*